(12) United States Patent
Van Werven et al.

(10) Patent No.: US 12,226,970 B2
(45) Date of Patent: Feb. 18, 2025

(54) GRIPPER, GRIPPER STATION AND METHOD FOR GRIPPING AN ANNULAR TIRE COMPONENT

(71) Applicant: VMI Holland B.V., Epe (NL)

(72) Inventors: Timen Anton Van Werven, Epe (NL); Robin Nusselder, Epe (NL); Willem Marinus Van Beek, Epe (NL)

(73) Assignee: VMI HOLLAND B.V. (NL)

( * ) Notice: Subject to any disclaimer, the term of this patent is extended or adjusted under 35 U.S.C. 154(b) by 8 days.

(21) Appl. No.: 18/683,356

(22) PCT Filed: Jul. 26, 2022

(86) PCT No.: PCT/EP2022/070925
§ 371 (c)(1),
(2) Date: Feb. 13, 2024

(87) PCT Pub. No.: WO2023/025496
PCT Pub. Date: Mar. 2, 2023

(65) Prior Publication Data
US 2024/0326367 A1    Oct. 3, 2024

(30) Foreign Application Priority Data

Aug. 27, 2021 (NL) ...................................... 2029073

(51) Int. Cl.
*B66C 1/54* (2006.01)
*B25J 15/00* (2006.01)
(Continued)

(52) U.S. Cl.
CPC ...... *B29D 30/2607* (2013.01); *B25J 15/0047* (2013.01); *B29D 30/0016* (2013.01);
(Continued)

(58) Field of Classification Search
CPC .. B25J 15/0047; B29D 30/0016; B60B 30/06; B60B 30/08
(Continued)

(56) References Cited

U.S. PATENT DOCUMENTS

| 3,337,173 A | * | 8/1967 | Soderquist | ......... B29D 30/0603 |
| | | | | 211/23 |
| 4,279,438 A | * | 7/1981 | Singh | .................. B29D 30/0016 |
| | | | | 294/195 |

(Continued)

FOREIGN PATENT DOCUMENTS

| CN | 104015385 | 9/2014 | ............. B29D 30/08 |
| CN | 104302468 A | 1/2015 | |

(Continued)

OTHER PUBLICATIONS

Dutch Search Report issued in NL Patent Appln. No. 2029073, dated May 11, 2022, 4 pages.
(Continued)

*Primary Examiner* — Paul T Chin
(74) *Attorney, Agent, or Firm* — HAYES SOLOWAY P.C.

(57) ABSTRACT

A gripper, a gripper station and a method for gripping an annular tire component, wherein the gripper has a plurality of gripper members distributed in a circumferential direction about a gripper axis and movable with at least a vector component in a radial direction perpendicular to the gripper axis over a main range with a radially inner endpoint and a radially outer endpoint. The gripper further has a limiter for limiting the movement of the plurality of gripper members in the radial direction to a subrange within the main range, wherein the subrange has an adjustable subrange position relative to the main range. The gripper has a synchronization member for synchronizing movements of the plurality of gripper members in the radial direction, wherein the synchronization member defines the main range, and wherein (Continued)

the limiter is arranged for limiting the synchronization member to define the subrange.

30 Claims, 7 Drawing Sheets (51) Int. Cl.
    *B29D 30/00*     (2006.01)
    *B29D 30/26*     (2006.01)
    *B60B 30/06*     (2006.01)
    *B60B 30/08*     (2006.01)

(52) U.S. Cl.
    CPC .............. *B60B 30/06* (2013.01); *B60B 30/08* (2013.01); *B29D 2030/0044* (2013.01)

(58) Field of Classification Search
    USPC ........................................ 294/93, 94; 157/16
    See application file for complete search history.

(56) References Cited

U.S. PATENT DOCUMENTS

| | | | | |
|---|---|---|---|---|
| 5,395,150 | A * | 3/1995 | Imler | B66C 1/54 |
| | | | | 294/93 |
| 6,916,026 | B2 * | 7/2005 | Meza | B60C 25/0545 |
| | | | | 157/16 |
| 8,939,486 | B2 * | 1/2015 | Gorham | B25J 15/10 |
| | | | | 294/93 |
| 10,507,698 | B2 * | 12/2019 | Gonzaga | B60C 25/0545 |
| 2003/0102640 | A1 * | 6/2003 | Saito | B25J 9/104 |
| | | | | 279/123 |
| 2008/0128093 | A1 | 6/2008 | Rogalla | |
| 2015/0083307 | A1 | 3/2015 | Slot et al. | |
| 2023/0124516 | A1 | 4/2023 | Conti et al. | |

FOREIGN PATENT DOCUMENTS

| | | | |
|---|---|---|---|
| CN | 107584708 A | 1/2018 | |
| CN | 110087871 A | 8/2019 | |
| CN | 112644048 | 4/2021 | ............. B29D 30/26 |
| CN | 220535000 U | 2/2024 | |
| DE | 102006057171 A1 | 6/2008 | |
| DE | 102013102583 | 9/2014 | ............. B29D 30/26 |
| EP | 2903810 | 8/2015 | ............. B29D 30/26 |
| JP | 2004136607 | 5/2004 | ............. B29D 30/08 |
| JP | 201318274 A | 1/2013 | |
| JP | 201322714 A | 2/2013 | |
| JP | 202082583 A | 6/2020 | |
| KR | 20140050790 | 4/2014 | ............. B29D 30/32 |

OTHER PUBLICATIONS

International Search Report and Written Opinion issued in WO Patent Appln. No. PCT/EP2022/070925, dated Oct. 14, 2022, 9 pages.

Japanese Office Action issued in JP Patent Appln. No. JP2022-569611, dated Nov. 28, 2023, with English translation, 4 pages.

International Preliminary Report on Patentability issued in WO Patent Appln. No. PCT/EP2022/070925, dated Feb. 27, 2024, 6 pages.

Japanese Decision to Grant issued in Japanese Patent Appln. No. 2022-569611, dated May 7, 2024, 5 pages.

Office Action issued in Chinese Patent Appln. Serial No. 202211028051.6 issued Jun. 20, 2024, with English translation, 10 pages.

* cited by examiner

GRIPPER, GRIPPER STATION AND METHOD FOR GRIPPING AN ANNULAR TIRE COMPONENT

BACKGROUND

The invention relates to a gripper, a gripper station and a method for gripping an annular tire component, such as an annular bead, annular bead ring, an annular apex filler or an annular bead-apex assembly.

KR 2014 0050790 A discloses an adjustable bead wire gripper with a plurality of supports distributed in a circumferential direction about a gripper axis and a rotating plate with curved slots to synchronously expand the supports in a radial direction perpendicular to the gripper axis over a gripping range that is sufficient to engage both bead wires with a small diameter and bead wires with a large diameter. Prior to gripping a bead wire, the plurality of supports are returned to the radially inner endpoint of the gripping range. The supports are subsequently expanded in the radial direction until the supports engage the bead wire at the correct diameter. Hence, bead wires of different sizes can be conveniently engaged without the need to exchange parts.

A disadvantage of the known bead wire gripper is that, for a batch of bead wires having the same, relatively large diameter, the supports have to be repeatedly moved over a considerable part of the gripping range to ultimately engage each bead wire. The repeated movement unnecessarily consumes valuable cycle time. Moreover, the drive that is required to move the supports over the entire gripping range may not be optimally suited to reliably and/or accurately position the supports at the correct diameter.

DE 10 2013 102583 A1 discloses a bead transfer ring with segments, each with its own drive cylinder to radially move the respective segment within a respective range and its own adjustment mechanism for adjusting the position of drive cylinder relative to the ring body. The adjustment mechanisms are actuated with the use of additional cylinders.

SUMMARY OF THE INVENTION

A disadvantage of the bead transfer ring disclosed in DE 10 2013 102583 A1 is that the individual adjustment mechanism for each segment adds to the overall complexity, weight, cost and maintenance demands of the bead transfer ring. Moreover, it may be difficult to synchronize the movements of the various pneumatically operated cylinders, which may lead to one or more adjustment mechanisms being fixed out of position with respect to the rest of the adjustment mechanisms and/or one or more segments not being moved synchronously with respect to the others by their respective drive cylinders.

It is an object of the present invention to provide a gripper, a gripper station and a method for gripping an annular tire component, wherein tire components of different diameters can be gripped more reliably and/or accurately.

According to a first aspect, the invention provides a gripper for gripping an annular tire component, wherein the gripper comprises a plurality of gripper members distributed in a circumferential direction about a gripper axis and movable with at least a vector component in a radial direction perpendicular to the gripper axis over a main range with a radially inner endpoint and a radially outer endpoint, wherein the gripper further comprises a limiter for limiting the movement of the plurality of gripper members in the radial direction to a subrange within the main range, wherein the subrange has an adjustable subrange position relative to the main range, wherein the gripper comprises a synchronization member for synchronizing the movements of the plurality of gripper members in the radial direction, wherein the synchronization member defines the main range, wherein the limiter is arranged for limiting the synchronization member to define the subrange.

By limiting the synchronization member, the limiter can indirectly and synchronously limit the movements of all gripper members to the subrange. Although the use of a rotating plate with curved slots as a synchronization member is disclosed in KR 2014 0050790 A, such a synchronization member, when applied to bead transfer ring of DE 10 2013 102583 A1, can only be reasonably considered as an alternative to the individual adjustment mechanisms for synchronously repositioning the individual drive cylinders. The operational movements of the segments are still driven by the individual drive cylinders. The combination of KR 2014 0050790 A with DE 10 2013 102583 A1 does not in any way disclose or suggest the use of a limiter to limit the movement of the synchronization member for the purpose of indirectly and synchronously limiting the movements of all gripper members to the subrange. The technical advantage of this differentiating feature is that the gripper according to the present invention is considerably less complex, which may result in weight or cost savings, and/or less maintenance. Moreover, the gripper members can be controlled more synchronously, thereby improving the reliability and accuracy when gripping the tire component.

Preferably, the limiter comprises a drive member for driving the synchronization member, wherein the drive member has a drive stroke that defines the subrange. In other words, the drive member can move the synchronization member only within the drive stroke, i.e. over a limited drive range corresponding to the subrange.

More preferably, the drive member is switchable between a coupled state for driving the synchronization member within the subrange and an uncoupled state in which the drive member is free to move relative to the synchronization member to adjust the subrange position. In other words, in the uncoupled state one of the drive member and the synchronization member is allowed to move relative to the other of the drive member and the synchronization member to adjust the subrange position relative to the main range for gripping an annular tire component of another diameter. Once the subrange position has been adjusted, the drive member can be switched back to the coupled state to fix the subrange position relative to the main range.

In one particular embodiment the drive member is steplessly adjustable relative to the synchronization member. Hence, the gripper can be adjusted for any diameter.

Alternatively, the drive member is adjustable relative to the synchronization member in steps. The steps may correspond to common diameters of the annular tire components, i.e. common inch sizes.

In one embodiment of such a stepped adjustment, the synchronization member comprises an index element that defines a plurality of index positions corresponding to different steps in the subrange position, wherein the driver member comprises a coupling element that is connectable to the index element in any index position of the plurality of index positions. The index element may thus be (re)positioned in any one of the index positions to select a subrange position corresponding to a certain step in the diameter of the annular tire component to be engaged.

The coupling element may be manually operable or it may be remotely controllable. The manual operation can be relatively low-tech, i.e. by inserting a pin in an index hole.

It however requires operator intervention in a potentially hazardous environment. By remotely controlling the coupling element, i.e. pneumatically, hydraulically, electrically and/or electronically, no operator intervention is required. In other words, the adjustment of the subrange can be at least partially automated.

In a further embodiment one of the drive member and the synchronization member comprises a first handling element that is engageable by an adjustment member external to the gripper for moving said one of the drive member and the synchronization member relative to the other of the drive member and the synchronization member. By having an adjustment member that is external to the gripper, i.e. not part of the gripper, the gripper itself does not require an adjustment member to adjust the subrange position. In particular, the gripper does not need an adjustment member that locks one of the drive member and the synchronization member relative to the other of the drive member and the synchronization member.

In a further embodiment the drive member comprises a cylinder, preferably a pneumatic cylinder, that defines the subrange. A pneumatic cylinder has a limited drive stroke suitable for driving the synchronization member over a limited range corresponding to the subrange.

In one specific embodiment the synchronization member comprises a spiral plate with a plurality of spiral slots circumferentially distributed about the gripper axis, wherein each gripper member of the plurality of gripper members comprises a cam-follower received in a respective spiral slot of the plurality of spiral slots, wherein the spiral plate is rotatable about the gripper axis to drive the plurality of gripper members in the radial direction through interaction between the respective cam-follower s and their respective spiral slots, wherein the limiter is arranged for limiting the rotation of the spiral plate about the gripper axis. The spiral plate can conveniently synchronize the movements of the gripper members.

The spiral slots are shaped such that the ratio between angular displacement of the spiral plate and radial displacement of the plurality of gripper members is the same for any angular position of the spiral plate within the main range. Hence, the subrange can have the same size, regardless of where said subrange is positioned within the main range.

Preferably, the synchronization member comprises an index element that defines a plurality of index positions corresponding to different steps in the subrange position, distributed in the circumferential direction. The index element can be used to select the subrange position for a selection of steps within the main range, i.e. based on the most common tire component diameters or inch sizes.

Additionally or alternatively, the synchronization member comprises a first handling element that is engageable by an adjustment member external to the gripper for rotating the synchronization member relative to the drive member. This has the same technical advantage as mentioned earlier in relation to the first handling member and the external adjustment member, only now in the context of the spiral plate.

Preferably, the first handling element protrudes from the spiral plate in a direction parallel to the gripper axis. The first handling element can thus be easily engaged and/or locked by the adjustment member, by positioning said adjustment member in the path travelled by said first handling element alongside the spiral plate.

In another embodiment the subrange is less than fifty percent of the main range, and preferably less than thirty percent of the main range. When the subrange is considerably smaller than the main range, lots of cycle time can be saved and/or the movement can be much more accurate.

In another embodiment each gripper member is provided with a retaining member that is movable between a retaining position for retaining the tire component at the respective gripper member and a release position for releasing the tire component from the respective gripper member. In the retaining position, the retaining member can prevent unintentional release of tire component from the respective gripper member.

In another embodiment each gripper member is provided with an ejection member for ejecting the tire component from the respective gripper member in an ejection direction parallel or substantially parallel to the gripper axis. The ejection member can promote or ensure that the tire component is actually ejected from the respective gripper member when the tire component is supposed to be release from the gripper.

In an embodiment that combines the two previous embodiments, the retaining member is configured for blocking the ejection of the tire component from the respective gripper member in the ejection direction when the retaining member is in the retaining position and for allowing the ejection of the tire component from the respective gripper member in the ejection direction when the retaining member is in the release position. Hence, the retaining member and the ejecting member can cooperate such that the tire component can not be ejected when the retaining member is active.

According to a second aspect, the invention provides a gripper station comprising the gripper according to any one of the aforementioned embodiments, wherein the gripper station further comprises an adjustment member external to the gripper for setting the subrange position.

The gripper station includes the aforementioned gripper and thus has the same technical advantages, in particular in relation to the external adjustment member.

Preferably, the adjustment member is located in an adjustment position, wherein the gripper station further comprises a manipulator for moving the gripper between an operational position in which the gripper is spaced apart from the adjustment member and the adjustment position in which the gripper interacts with the adjustment member for setting the subrange position. In the operation position, the gripper can be used to engage and/or grip an annular tire component. In the adjustment position the adjustment member can alter the behavior of the gripper by fixing the position of one of the elements of the gripper with respect to other elements of the gripper, i.e. to set or adjust the subrange position.

More preferably, the adjustment member is arranged to remain stationary in the adjustment position during the setting of the subrange position, wherein the manipulator is arranged for moving one of the drive member and the synchronization member relative to the adjustment member to adjust the subrange position. Consequently, the adjustment member can be a passive component.

Additionally or alternatively, one of the drive member and the synchronization member comprises a first handling element that is engaged by the adjustment member when the gripper is moved into the adjustment position, wherein the manipulator is arranged for moving the other of the drive member and the synchronization member relative to said one of the drive member and the synchronization member when the first handling element is engaged by the adjustment member. Although the manipulator is normally used to position the gripper relative to the annular tire component, its drives and/or freedom of movement can now also be used for adjusting the subrange position.

In a further embodiment the synchronization member comprises a spiral plate with a plurality of spiral slots circumferentially distributed about the gripper axis, wherein each gripper member of the plurality of gripper members comprises a cam-follower received in a respective spiral slot of the plurality of spiral slots, wherein the spiral plate is rotatable about the gripper axis to drive the plurality of gripper members in the radial direction through interaction between the respective cam-follower s and their respective spiral slots, wherein the limiter is arranged for limiting the rotation of the spiral plate about the gripper axis, wherein the synchronization member comprises a first handling element that is engaged by the adjustment member when the gripper is moved into the adjustment position. This has the same technical advantage as mentioned earlier in relation to the first handling member and the external adjustment member, only now in the context of the gripper station as a whole.

According to a third aspect, the invention provides a method for gripping an annular tire component using the gripper according to any one of the embodiments according to the first aspect of the invention, wherein the method comprises the steps of:

adjusting the subrange position relative to the main range defined by the synchronization member; and limiting the synchronization member with the limiter to define the subrange and to limit the movement of the plurality of gripper members to said subrange.

The method relates to the practical implementation of the gripper according to the first aspect of the invention and thus has the same technical advantages, which will not be repeated hereafter.

Preferably, the limiter comprises a drive member for driving the synchronization member, wherein the drive member has a drive stroke that defines the subrange, wherein the drive member is switchable between a coupled state for driving the synchronization member within the subrange and an uncoupled state in which the drive member is free to move relative to the synchronization member to adjust the subrange position, wherein the method further comprises the steps of:

switching the drive member to the uncoupled state;
adjusting the subrange position; and
switching the drive member to the coupled state.

In one particular embodiment the drive member is steplessly adjusted relative to the synchronization member. Alternatively, the drive member is adjusted relative to the synchronization member in steps.

In a further embodiment the method further comprises the steps of:

providing an adjustment member in an adjustment position external to the gripper for setting the subrange position;

moving the gripper between an operational position in which the gripper is spaced apart from the adjustment member and the adjustment position in which the gripper interacts with the adjustment member;

setting the subrange position with the adjustment member when the gripper is in the adjustment position.

Preferably, the adjustment member remains stationary in the adjustment position during the setting of the subrange position, wherein one of the drive member and the synchronization member is moved relative to the adjustment member to adjust the subrange position.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
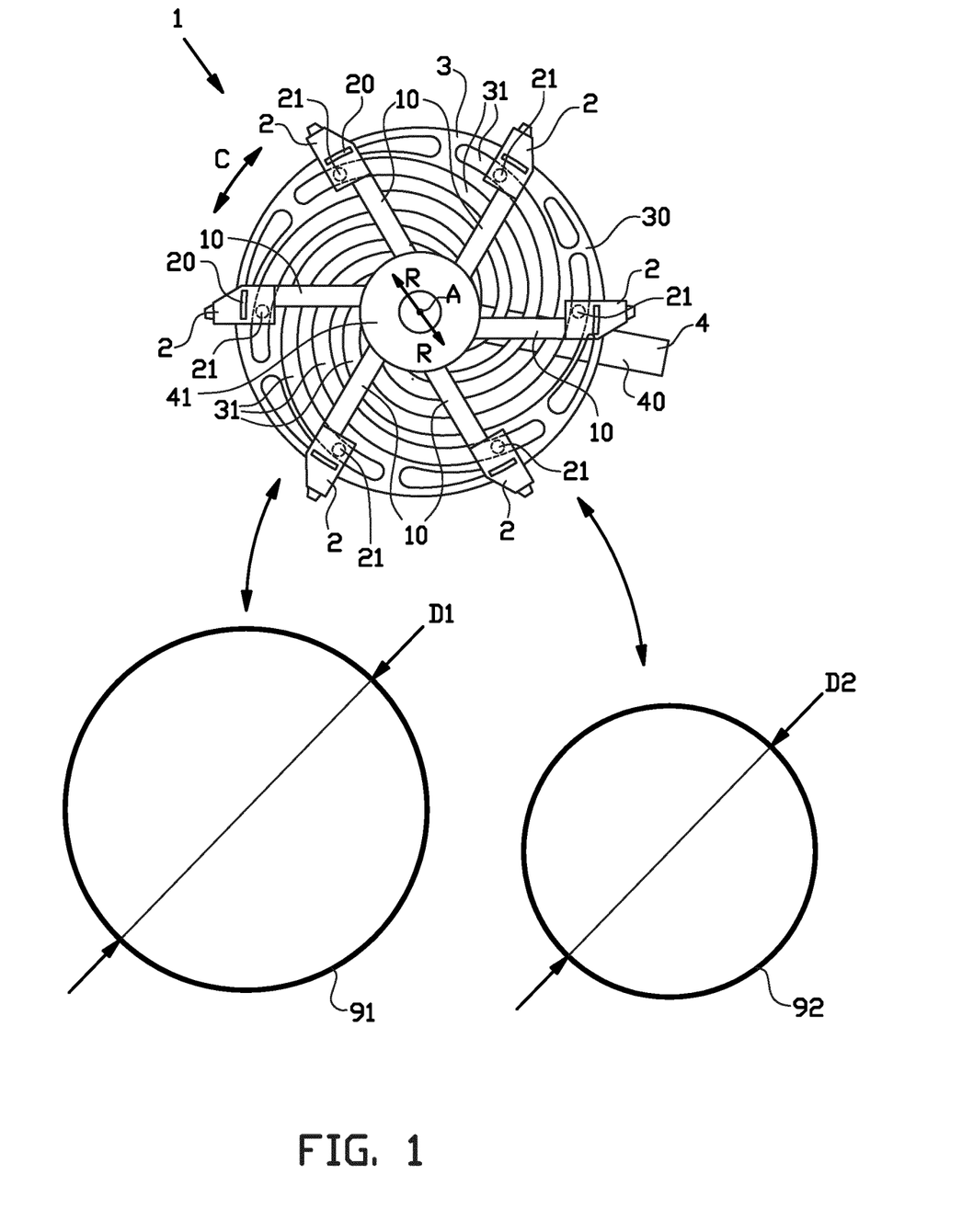
FIG. 1 shows a front view of a gripper with a plurality of gripper members according to a first exemplary embodiment of the invention.
Figure 2A:
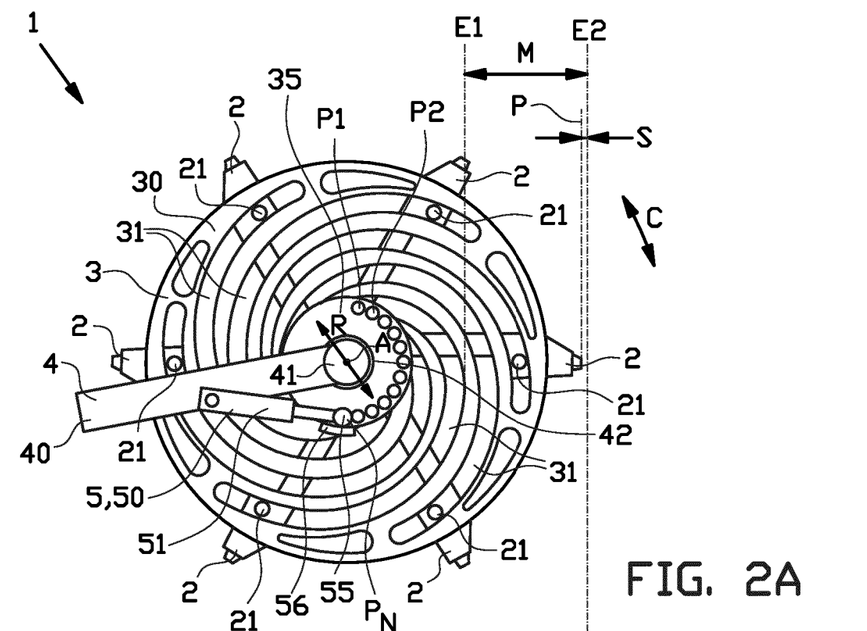
FIGS. 2A and 2B show a rear view of the gripper according to FIG. 1, during the steps of moving the plurality of gripping members within a subrange.
Figure 2B:
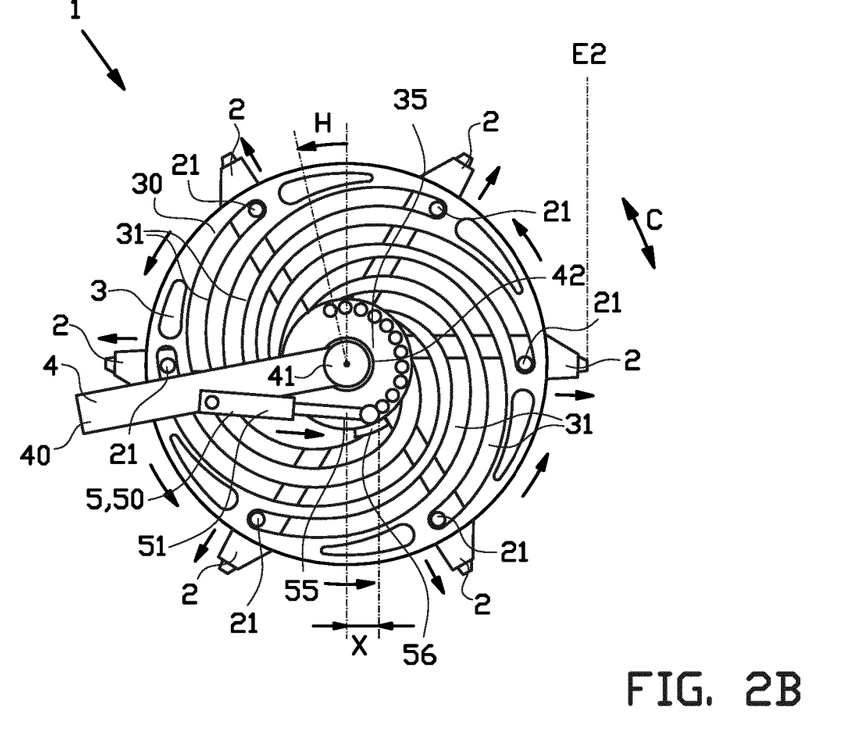
Figure 3A:
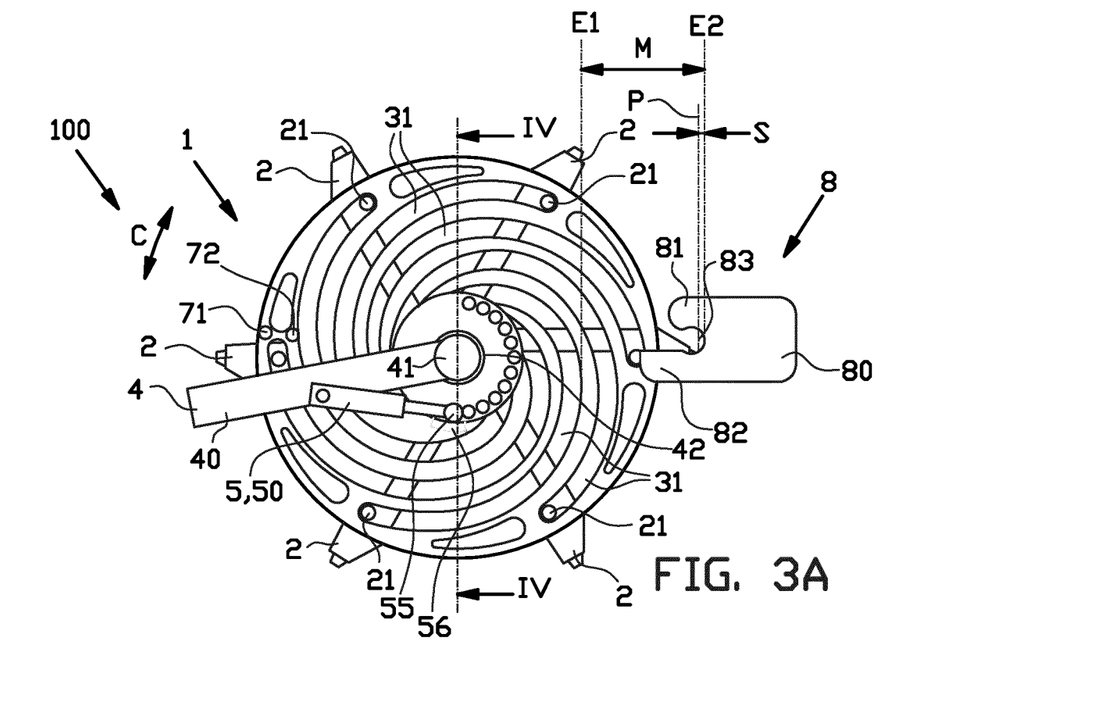
FIGS. 3A, 3B and 3C show a rear view of a gripper station comprising the gripper according to FIG. 1 and an adjustment member, during the steps of adjusting a subrange position of the subrange relative to a main range.
Figure 3B:
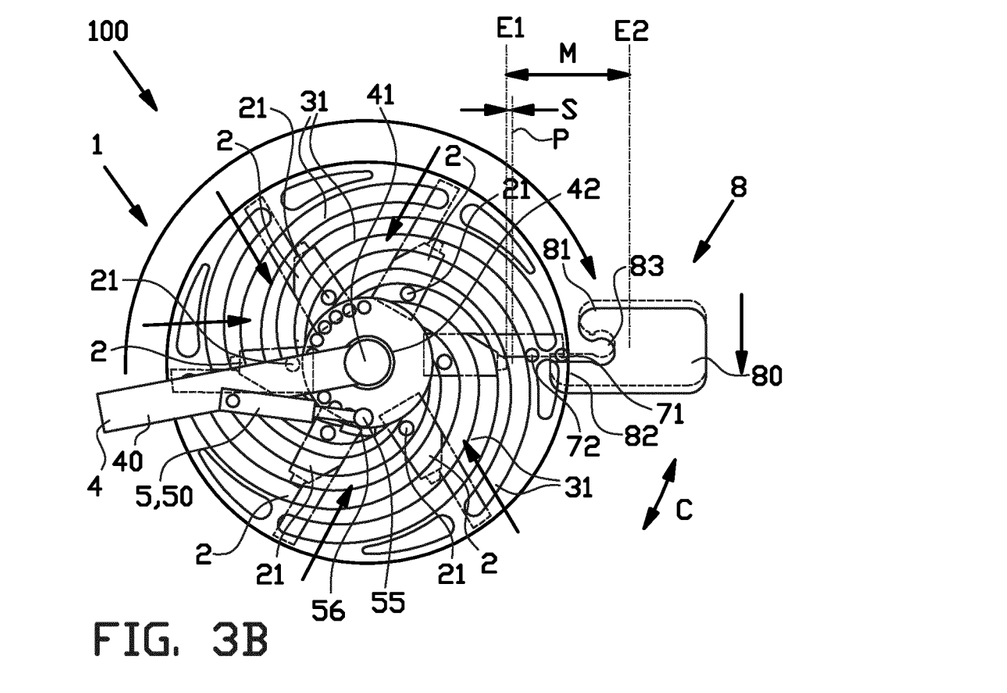
Figure 3C:
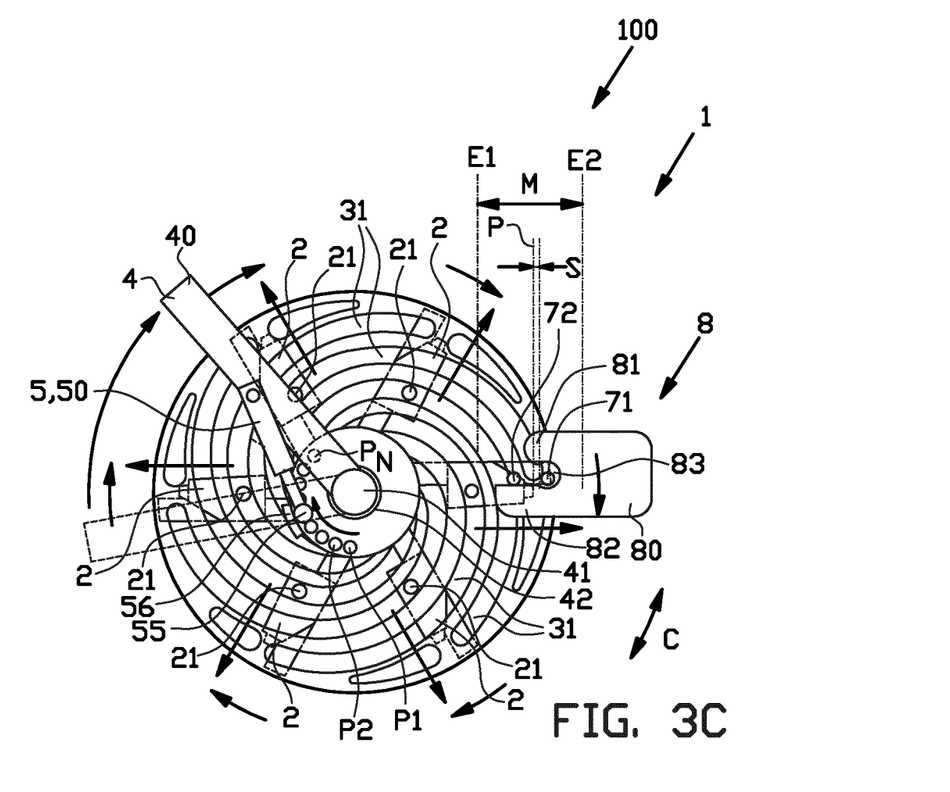

FIGS. 1, 2A and 2B show a gripper 1 for gripping an annular tire component 91, 92. FIGS. 3A-3C show the gripper 1 as part of a gripper station 100, further comprising a manipulator 4, for positioning the gripper 1 and an adjustment member 8 external to said gripper 1 for adjusting the configuration of the gripper 1 in a manner that will be discussed hereafter in more detail.

FIG. 1 shows the manipulator 4 in a simplified manner. The manipulator 4 comprises an arm 40 and a head 41 at the distal end of said arm 41. The arm 40 and/or the head 41 may be about or along various axes. The manipulator 4 may for example be a multi-axis robot. The base of the manipulator 4 is not shown.

As shown in FIG. 1, the gripper 1 is configured for engaging or gripper annular tire components 91, 92 of different sizes, in particular different diameters D1, D2. The annular tire components 91, 92 may be beads, bead rings, apexes or bead-apexes, used in tire manufacturing. The annular tire components 91, 92 may be semi-finished products, or they may already be integrated or incorporated into a green or unvulcanized tire. Hence, by engaging the annular tire component 91, 92, the gripper 1 either engages said individual tire component 91, 92, or the green or unvulcanized tire as a whole.

As best seen in FIG. 1, the gripper 1 comprises a plurality of gripper members 2 distributed in a circumferential direction C about a gripper axis A. The gripper members 2 are movable in a radial direction R perpendicular to the gripper axis A or with at least a vector component in said radial direction R. In particular, the gripper 1 is provided with a plurality of linear guides 10 for linearly guiding the gripper members 2 as they are moved in the radial direction R. Preferably, the linear guides 10 are mounted in a fixed relationship to the manipulator 4 so that they remain stationary relative to the head 41 thereof. Each gripper member 2 is provided with a gripper body 20 that is suitably shaped to contact the annular tire component 91, 92 in a radially outward direction.

As shown in FIGS. 2A and 2B, the gripper members 2 are movable in the radial direction R across, along or over a main range M. The main range M is defined by or extends within a radially inner endpoint E1 and a radially outer endpoint E2. The gripper 1 comprises a synchronization member 3 for synchronizing the movements of the gripper members 2 in the radial direction R. In other words, the synchronization member 3 ensures that all gripper members 2 are moved radially inwards and radially outwards simultaneously and/or to the same extent.

In this example, the synchronization member 3 comprises a spiral plate 30 with a plurality of spiral slots 31 circumferentially distributed about the gripper axis A. Each gripper member 2 comprises a cam-follower 21 received in a respective spiral slot 31. The spiral plate 30 is rotatable about the gripper axis A to drive the gripper members 2 in the radial direction R through interaction between the respective cam-followers 21 and their respective spiral slots 31.

The spiral plate 30 is rotatably mounted on the head 41. In particular, the manipulator 4 comprises an adjustment drive 42 for rotating the spiral plate 30 relative to the head 41. Note that the linear guides 10 which carry the gripper members 2 are configured to remain in a fixed orientation relative to the head 41 while the spiral plate 30 is being rotated. Hence, rotation of the spiral plate 30 causes the cam-followers 21 associated with said gripper members 2 to move through the spiral slots 31, thereby forcing the respective gripper members 2 to move radially inwards or outwards, depending on the rotation direction of the spiral plate 30.

The spiral slots 31 spiral relative to the gripper axis A at a relatively small angle or pitch, such that for each angle of rotation of the spiral plate 30, the gripper members 2 are moved only slightly in the radial direction R. In this example, displacement of the gripper members 2 across the entire main range M requires a rotation of more than one-hundred-and-twenty degrees, in particular more than one-hundred-and-eighty degrees. The length of the spiral slots 31 defines the main range M of the gripper members 2.

As shown in FIGS. 2A and 2B, the gripper 3 further comprises a limiter 5 that can be selectively coupled to and uncoupled from the gripper members 2 for limiting the movement of the gripper members 2 in the radial direction R to a subrange S within the main range M. In particular, the limiter 5 is configured or arranged for limiting the synchronization member 3, more in particular for limiting the rotation of the spiral plate 30 about the gripper axis A to a limited angular displacement H, as shown in FIG. 2B.

Preferably, the spiral slots 31 are shaped such that the ratio between angular displacement of the spiral plate 30 and radial displacement of the plurality of gripper members 2 is the same for any angular position of the spiral plate 30 within the main range M. Hence, the subrange S can have the same size, regardless of where said subrange S is positioned within the main range M.

In this example, the limiter 5 is configured for mechanically or physically limiting the movements of the gripper members 2. Preferably, the limiter 5 comprises or is a drive member 50 for driving the synchronization member 3. More specifically, the drive member 50 may have a drive stroke X, as shown in FIG. 2B, that defines the subrange S. In this example, the drive member 50 comprises a cylinder 51, preferably a pneumatic cylinder, that drives a plunger to move across the drive stroke X. The plunger is connected via a coupling element 55 to the synchronization member 3, more specifically to the spiral plate 30, to convert the linear motion of the plunger into a rotation of the spiral plate 30 about the gripper axis A.

It will be apparent to one skilled in the art that many variations on the drive member 50 are possible that would yet be encompassed by the scope of the present invention, such as any other type of linear drive, a rotary drive engaging directly onto the spiral plate 30 and/or gears, chains, belt or the like, mechanically imparting a torque onto the spiral plate 30.

The coupling element 55 is switchable between a coupled state in which the drive member 50 can drive the synchronization member 3 within the subrange S and an uncoupled state in which the drive member 50 is free to move relative to the synchronization member 3 to adjust the position P of said subrange S. The subrange position P is to be interpreted as the position of the subrange S as a whole relative to the main range M. In this example, the subrange position P is schematically represented by the radial position of one of its endpoints.

Figure 4:
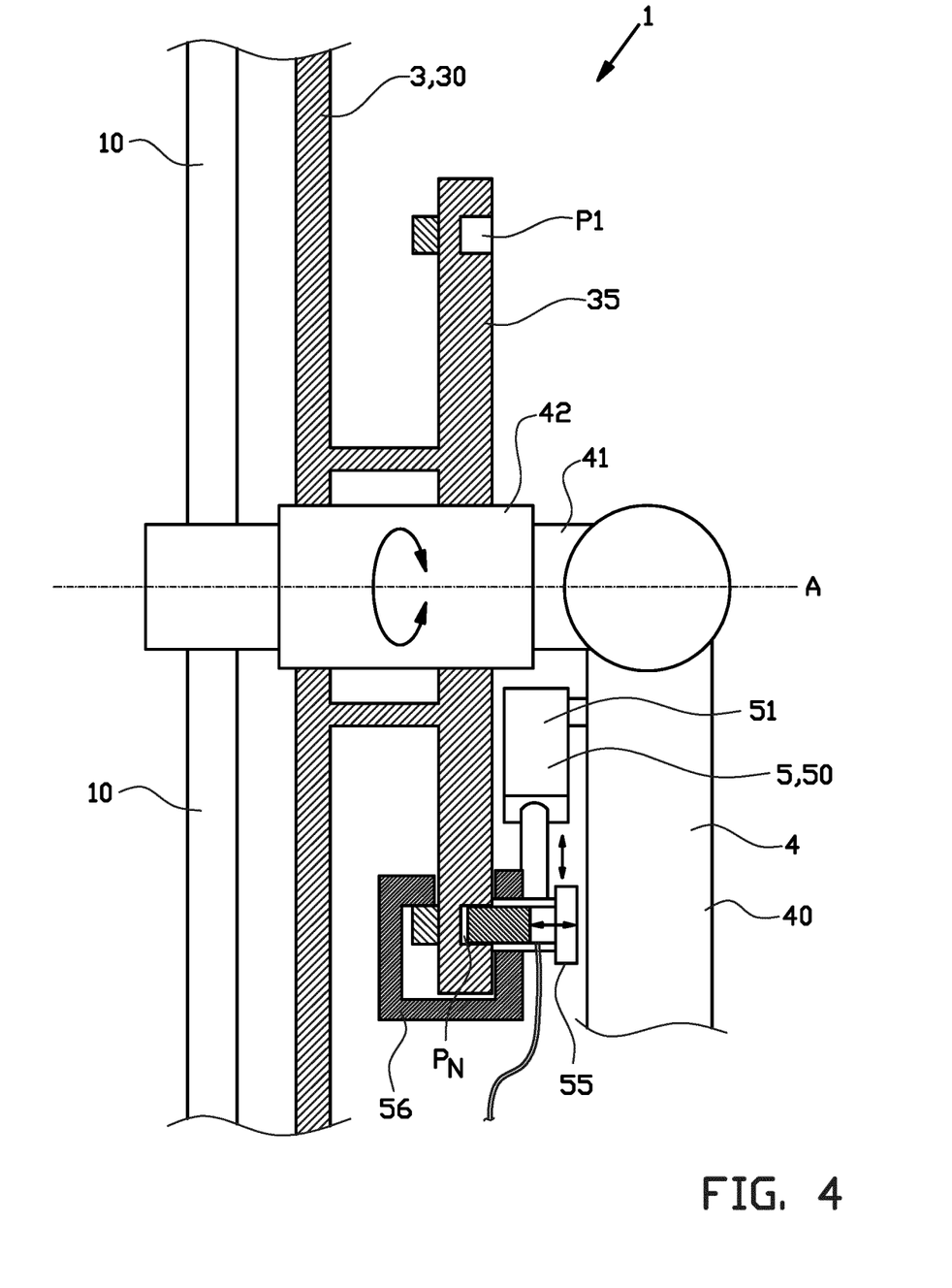
FIG. 4 shows a cross section of the gripper according to the line IV-IV in FIG. 3A.

As schematically shown in FIG. 4, the coupling element 55 may be remotely or automatically controlled to switch between the coupled state and the uncoupled state, for example pneumatically or with a servo motor. Alternatively, the coupling element 55 may be configured to be operated manually, i.e. by pulling back on or pressing onto the knob.

In this exemplary embodiment, as best seen in FIGS. 2A and 2B, the synchronization member 3 comprises an index element 35 that defines a plurality of index positions P1, P2, . . . , Pn corresponding to different steps in the subrange position S, distributed in the circumferential direction C. The index positions P1, P2, . . . , Pn may for example correspond to common diameters D1, D2 of the annular tire components 91, 92, as shown in FIG. 1, for example common inch sizes.

In this example, the index element 35 is formed by a disc with a plurality of apertures, openings or recesses representing the plurality of index positions P1, P2, . . . , Pn. The index element 35 is coupled to or integral with the spiral plate 30 so as to rotate together about the gripper axis A. The coupling element 55 may be provided with a guide shoe 56 that engages a rim of the index element 35 to keep the coupling element 55 aligned with the index positions P1, P2, . . . , Pn as the drive member 50 is uncoupled from and free to rotate relative to the synchronization member 3 about the gripper axis A. The coupling element 55, is configured to be coupled or connected to the synchronization member 3 in any of the index positions P1, P2, . . . , Pn. In other words, the drive member 50 is adjustable relative to the synchronization member 3 in steps. More specifically, the coupling element 55 may comprise a pin that is insertable in one of the index positions P1, P2, . . . , Pn, as schematically shown in FIG. 4.

Alternatively, the coupling element may be of the clamping type (not shown) to clampingly engage the synchronization member 3 in any angular position. In such an embodiment, the drive member would be steplessly adjustable relative to the synchronization member 3.

By moving the drive member 50 relative to the synchronization member 3, or vice versa, the subrange S has an adjustable subrange position P relative to the main range M. In other words, the subrange position P may be located at or near the radially inner endpoint E1, at or near the radially outer endpoint E2, or at various intermediate positions along the main range M. For example, FIG. 2A shows the subrange S being arranged at a subrange position P corresponding to index position Pn such that the subrange S is at or near the radially outer endpoint E2. FIG. 3C shows the subrange S being adjusted to a subrange position P corresponding to one of the intermediate index positions such that the subrange S is spaced apart from said radially outer endpoint E2.

The subrange position P can be adjusted with the use of the aforementioned adjustment member 8, as shown in FIGS. 3A-3C. In this example, the adjustment member 8 is external to the gripper 3, i.e. not part of the gripper 3. Alternatively, an adjustment member (not shown) may be provided on the gripper 3 and/or the manipulator 4, e.g. in the form of a position setting drive, to adjust the subrange position P without requiring external adjustment means.

As shown in FIGS. 3A, 3B and 3C, the synchronization member 3 is provided with a first handling element 71 and a second handling element 72 which are engageable by the adjustment member 8. In this example, the first handling element 71 is located in a first engagement position on the spiral plate 30 and protruding from said spiral plate 30 in a direction parallel or substantially parallel to the gripper axis A. The second handling element 72 is located in a second engagement position on the spiral plate 30 radially inside of the first engagement position and protruding from said spiral plate 30 in the direction parallel or substantially parallel to the gripper axis A.

The adjustment member 8 is located in an adjustment position. The manipulator 4 is configured, programmed and/or controlled to move the gripper 1 between an operational position in which the gripper 1 is spaced apart from the adjustment member 8 and the adjustment position in which the gripper 1 interacts with the adjustment member 8 for setting the subrange position P.

More in particular, the adjustment member 8 comprises an adjustment body 80 that defines a lock finger 81, a catch finger 82 and a lock recess 83 between said lock finger 81 and said catch finger 82. The catch finger 82 is longer than and/or extends beyond the lock finger 81. As such, the catch finger 82 can be arranged in a path travelled by the first handling element 71 and/or the second handling element 72 when rotating the spiral plate 30 about the gripper axis A and when the gripper 3 is in the adjustment position, as shown in FIGS. 3B and 3C. In the case of FIG. 3B, when the catch finger 82 is only in the path of the second handling element 72, the spiral plate 30 can still be rotated in one rotation direction.

However, when the gripper 3 is moved further into engagement with the adjustment member 3, the lock finger 81 becomes situated in a path travelled by the first handling element 71 when rotating the spiral plate 30 about the gripper axis A, as shown in FIG. 3C. The first handling element 71 is then locked in the lock recess 83 between both the lock finger 81 as well as the catch finger 82 and the rotation of the spiral plate 30 can be blocked in both rotation directions. The second handling element 72 normally remains out of reach of the lock finger 81.

Optionally, the adjustment member 8 is configured to detect the interaction between the gripper 3 and the adjustment member 8. The adjustment member 8 may for example be allowed to move over a small detection distance with the synchronization member 3 once engaged, to allow for detection of said movement, as schematically shown in FIG. 3B with the positions of the adjustment member 8 prior to and after detection shown in dashed lines and solid lines, respectively.

Once engaged, the angular position of the synchronization member 3 can be fixed relative to the adjustment member 8 and the drive member 50 can be rotated relative to the fixed synchronization member 3, provided that the drive member 50 is in the uncoupled state. The manipulator 4 or the arm 40 thereof may be rotated to effectively change the angular position of the drive member 50 relative to the synchronization member 3. More in particular, with the coupling element 55 disengaged from the index element 35, the drive member 50 can freely move over and/or relative to index element 35 until the coupling element 55 is aligned with a chosen index position P1, P2, . . . , Pn, at which point the coupling element 55 may be engaged with said chosen index position P1, P2, . . . , Pn. The coupling element 55 and/or the index element 55 may be provided with suitable chamfers, centering and/or guide surfaces to absorb minor misalignments between them.

Note that the linear guide 10 and the gripper members 2 supported thereon also move with the manipulator 4 and/or the drive member 50 to the same extent, thereby causing the cam-followers 21 associated with said gripper members 2 to move through the respective spiral slots 31, thereby causing said gripper members 2 to change in radial position in accordance with the chosen subrange position P.

It will be apparent to one skilled in the art that instead of fixing the angular position of the synchronization member 3 and moving the drive member 50 relative to said synchronization member 3, alternatively, the drive member 50 may be fixed and instead the synchronization member 3 may be moved.

Figure 5A:
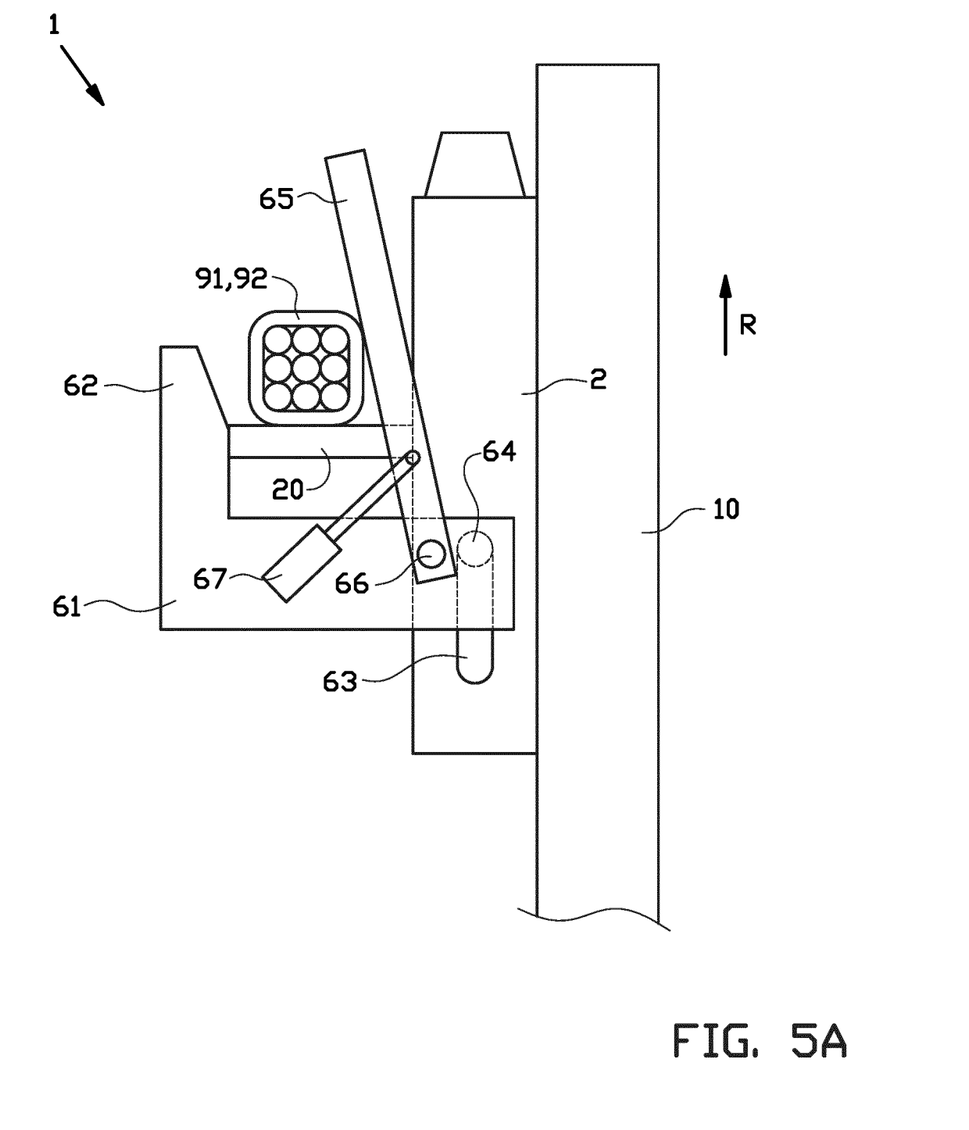
FIGS. 5A and 5B show details of the gripper members during the optional steps of a method for ejecting the tire component from the gripper.
Figure 5B:
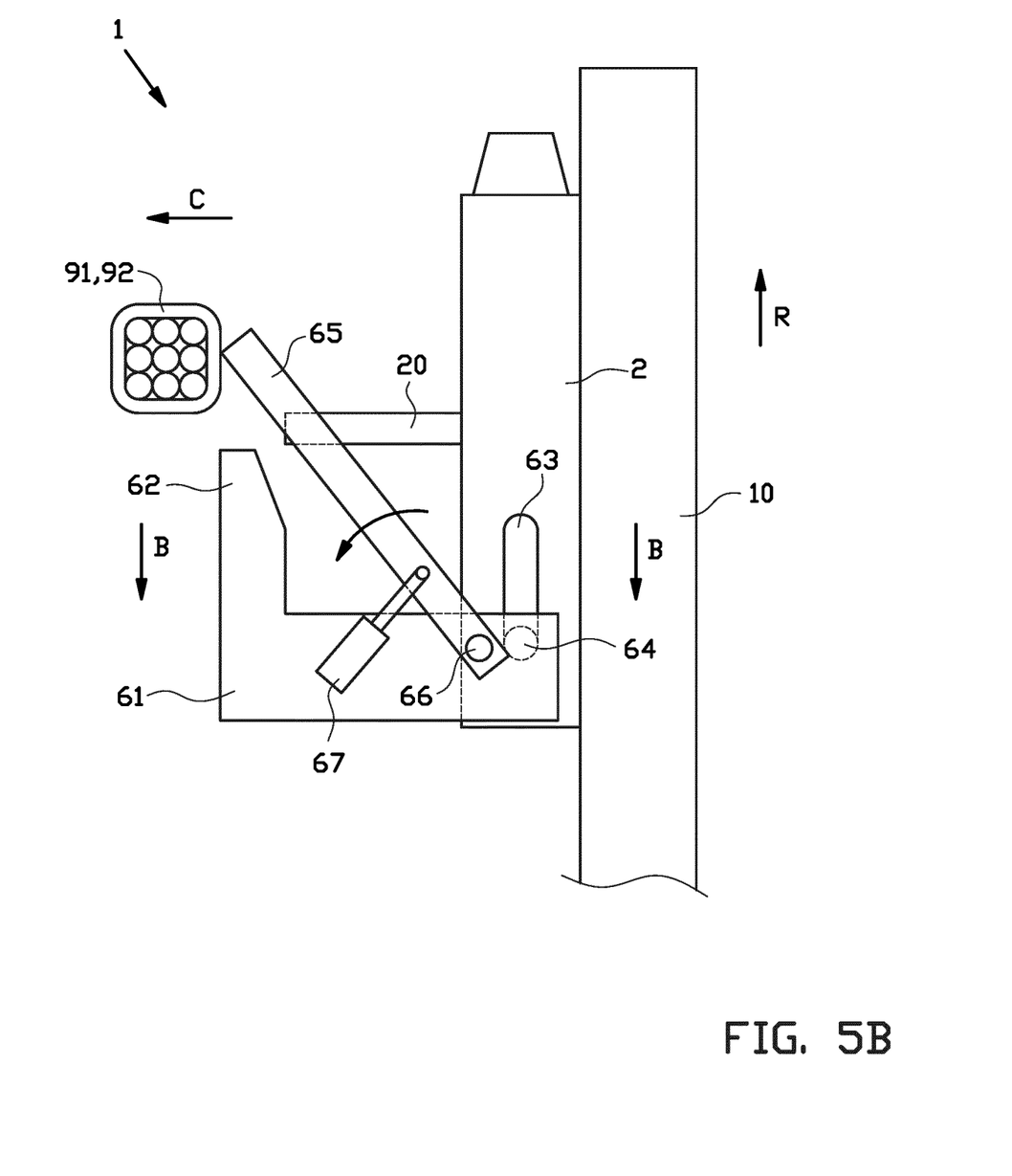

As shown in FIGS. 5A and 5B, each gripper member 2 may optionally be provided with an retaining member 61 for retaining the tire component 91, 92 on the gripper body 20 and/or with an ejection member 65 for ejecting the tire component 91, 92 from the gripper body 20. In particular, the retaining member 61 and the ejecting member 65 may be configured to cooperate such that the tire component 91, 92 can not be ejected when the retaining member 65 is active.

As best seen in FIG. 5A, the retaining member 61 comprises a retaining finger 62 that in a retaining position alongside the tire component 91, 92 to prevent or block ejection of the tire component 91, 92 from the gripper body 20 in an ejection direction C. In this example, the ejection direction C is parallel or substantially parallel to the gripper axis A, as shown in FIGS. 1 and 4. The gripper member 2 is provided with a release slot 63 extending in the radial direction R and the retaining member 61 is slidably engaged with the release slot 64, for example with the use of a guide pin 64. Hence, the retaining member 61 can be pulled radially inwards in a release direction B from the retaining position as shown in FIG. 5A to a release position as shown in FIG. 5B.

In this example, the ejection member 65 is formed as an ejection finger that is hingably supported relative to the gripper member 2, for example by a hinge point 66 at or on the retaining member 61. The gripper member 2 is further provided with an ejection actuator 67, for example a cylinder, for generating a relative movement of the ejection member 65 with respect to the gripper member 2 with at least a component in the ejection direction C. The ejection member 65 is movable between a standby position, as shown in FIG. 5A, and an ejection position, as shown in FIG. 5B. When moving from the standby position towards the ejection position, the ejection member 65 is configured for contacting and pushing the tire component 91, 92 from the gripper body 20 in the ejection direction E, preferably until the tire component 91, 92 is no longer supported in the radial direction R by the gripper body 20.

Note that in FIG. 5A, the tire component 91, 92 is locked in between the retaining finger 62 at one side and the ejection member 65 at the other side. As such, the retaining finger 62 and the ejection member 65 may cooperate, to some extent, to grip or clamp the tire component 91, 92 in a direction parallel to the gripper axis A.

A method for gripping the annular tire components 91, 92 of FIG. 1 with the use of the aforementioned gripper 1 will now be briefly elucidated with reference to FIGS. 1, 2A, 2B, 3A-3C and 4.

FIGS. 2A and 2B show the gripper 1 in the operational position with the gripper members 3 being controlled by the drive member 50 to move between the outer positions of the subrange S at a chosen subrange position P, i.e. for gripping a respective one of the annular tire component 91, 92 of FIG. 1 at a specific diameter D1, D2.

FIG. 3A shows the situation in which the gripper 1 has been moved into the adjustment position in which the catch finger 82 is in the path of the second handling element 72. The drive member 50 has been switched into the uncoupled state, i.e. disengaging the coupling element 55 from the index element 35.

FIG. 3B shows the situation in which the adjustment drive 42 of the manipulator 4 has rotated the synchronization member 3 about the gripper axis A until the second handling element 72 contacts the catch finger 82 of the adjustment member 8 and optionally triggers the detection that said second handling element 72 has been caught. The rotation of the spiral plate 30 has also caused the grippers 2 to move radially inwards towards the radially inner endpoint E1 of the main range M. After the radially inner endpoint E1 has been reached, the manipulator 4 moves the first handling element 71 of the gripper 1 into engagement with the lock recess 83 of the adjustment member 8, as shown in FIG. 3C, thereby locking the synchronization member 3 against rotation in both rotation directions.

FIG. 3C shows the situation after the manipulator 4 and/or the head 41 thereof has been rotated about the gripper axis A to move the drive member 50 relative to the synchronization member 3, in order to adjust the subrange position P, in the manner previously discussed. In this example, the drive member 50 is rotated over approximately sixty degrees to a chosen index position corresponding to a central region of the main range M. The coupling element 55 can now be coupled or reconnected to the index element 35, thereby setting the drive member 50 up for driving the synchronization member 3 in the newly chosen subrange position P, i.e. for a different diameter D1, D2 of the annular tire components 91, 92. The manipulator 4 can now move the gripper 3 back into the operational position of FIG. 2A, thereby terminating the engagement between the gripper 3 and the adjustment member 8.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS 1 gripper
10 guide
2 gripper member
20 gripper body
21 cam-follower
3 synchronization member
30 spiral plate
31 spiral slot
35 index element
4 manipulator
40 arm
41 head
42 adjustment drive
5 limiter
50 drive member
51 cylinder
55 coupling element
56 guide shoe
61 retaining member
62 retaining finger
63 release slot
64 guide pin
65 ejection member
66 ejection hinge
67 ejection actuator
71 first handling element
72 second handling element
8 adjustment member
80 adjustment body
81 lock finger
82 catch finger
83 lock recess
91 first annular tire component
92 second annular tire component
100 gripper station
A gripper axis
B release direction
C ejection direction
D1 first diameter
D2 second diameter
E1 radially inner endpoint
E2 radially outer endpoint
H angular displacement
M main range
P subrange position
P1, P2, . . . , Pn index positions
R radial direction
S subrange
X drive stroke

The invention claimed is:

1. A gripper for gripping an annular tire component, wherein the gripper comprises a plurality of gripper members distributed in a circumferential direction about a gripper axis and movable with at least a vector component in a radial direction perpendicular to the gripper axis over a main range with a radially inner endpoint and a radially outer endpoint, wherein the gripper further comprises a limiter for limiting the movement of the plurality of gripper members in the radial direction to a subrange within the main range, wherein the subrange has an adjustable subrange position relative to the main range, wherein the gripper comprises a synchronization member for synchronizing the movements of the plurality of gripper members in the radial direction, wherein the synchronization member defines the main range, wherein the limiter is arranged for limiting the synchronization member to define the subrange.

2. The gripper according to claim 1, wherein the limiter comprises a drive member for driving the synchronization member, wherein the drive member has a drive stroke that defines the subrange.

3. The gripper according to claim 2, wherein the drive member is switchable between a coupled state for driving the synchronization member within the subrange and an uncoupled state in which the drive member is free to move relative to the synchronization member to adjust the subrange position.

4. The gripper according to claim 3, wherein the drive member is steplessly adjustable relative to the synchronization member.

5. The gripper according to claim 3, wherein the drive member is adjustable relative to the synchronization member in steps.

6. The gripper according to claim 5, wherein the synchronization member comprises an index element that defines a plurality of index positions corresponding to different steps in the subrange position, wherein the driver member comprises a coupling element that is connectable to the index element in any index position of the plurality of index positions.

7. The gripper according to claim 6, wherein the coupling element is manually operable.

8. The gripper according to claim 6, wherein the coupling element is remotely controllable.

9. The gripper according to claim 3, wherein one of the drive member and the synchronization member comprises a first handling element that is engageable by an adjustment member external to the gripper for moving said one of the drive member and the synchronization member relative to the other of the drive member and the synchronization member.

10. The gripper according to claim 2, wherein the drive member comprises a cylinder that defines the subrange.

11. The gripper according to claim 1, wherein the synchronization member comprises a spiral plate with a plurality of spiral slots circumferentially distributed about the gripper axis, wherein each gripper member of the plurality of gripper members comprises a cam-follower received in a respective spiral slot of the plurality of spiral slots, wherein the spiral plate is rotatable about the gripper axis to drive the plurality of gripper members in the radial direction through interaction between the respective cam-followers and their respective spiral slots, wherein the limiter is arranged for limiting the rotation of the spiral plate about the gripper axis.

12. The gripper according to claim 11, wherein the spiral slots are shaped such that the ratio between angular displacement of the spiral plate and radial displacement of the plurality of gripper members is the same for any angular position of the spiral plate within the main range.

13. The gripper according to claim 11, wherein the synchronization member comprises an index element that defines a plurality of index positions corresponding to different steps in the subrange position, distributed in the circumferential direction.

14. The gripper according to claim 11, wherein the limiter comprises a drive member for driving the synchronization member, wherein the drive member has a drive stroke that defines the subrange, wherein the synchronization member comprises a first handling element that is engageable by an adjustment member external to the gripper for rotating the synchronization member relative to the drive member.

15. The gripper according to claim 14, wherein the first handling element protrudes from the spiral plate in a direction parallel to the gripper axis.

16. The gripper according to claim 1, wherein the subrange is less than fifty percent of the main range.

17. The gripper according to claim 1, wherein each gripper member is provided with a retaining member that is movable between a retaining position for retaining the tire component at the respective gripper member and a release position for releasing the tire component from the respective gripper member.

18. The gripper according to claim 17, wherein each gripper member is provided with an ejection member for ejecting the tire component from the respective gripper member in an ejection direction parallel to the gripper axis, wherein the retaining member is configured for blocking the ejection of the tire component from the respective gripper member in the ejection direction when the retaining member is in the retaining position and for allowing the ejection of the tire component from the respective gripper member in the ejection direction when the retaining member is in the release position.

19. The gripper according to claim 1, wherein each gripper member is provided with an ejection member for ejecting the tire component from the respective gripper member in an ejection direction parallel the gripper axis.

20. The gripper station comprising the gripper according to claim 1, wherein the gripper station further comprises an adjustment member external to the gripper for setting the subrange position.

21. The gripper station according to claim 20, wherein the adjustment member is located in an adjustment position, wherein the gripper station further comprises a manipulator for moving the gripper between an operational position in which the gripper is spaced apart from the adjustment member and the adjustment position in which the gripper interacts with the adjustment member for setting the subrange position.

22. The gripper station according to claim 21, wherein the limiter comprises a drive member for driving the synchronization member, wherein the drive member has a drive stroke that defines the subrange, wherein the adjustment member is arranged to remain stationary in the adjustment position during the setting of the subrange position, wherein the manipulator is arranged for moving one of the drive member and the synchronization member relative to the adjustment member to adjust the subrange position.

23. The gripper station according to claim 21, wherein the limiter comprises a drive member for driving the synchronization member, wherein the drive member has a drive stroke that defines the subrange, wherein one of the drive member and the synchronization member comprises a first handling element that is engaged by the adjustment member when the gripper is moved into the adjustment position, wherein the manipulator is arranged for moving the other of the drive member and the synchronization member relative to said one of the drive member and the synchronization member when the first handling element is engaged by the adjustment member.

24. The gripper station according to claim 21, wherein the synchronization member comprises a spiral plate with a plurality of spiral slots circumferentially distributed about the gripper axis, wherein each gripper member of the plurality of gripper members comprises a cam-follower received in a respective spiral slot of the plurality of spiral slots, wherein the spiral plate is rotatable about the gripper axis to drive the plurality of gripper members in the radial direction through interaction between the respective cam-followers and their respective spiral slots, wherein the limiter is arranged for limiting the rotation of the spiral plate about the gripper axis, wherein the synchronization member comprises a first handling element that is engaged by the adjustment member when the gripper is moved into the adjustment position.

25. A method for gripping an annular tire component using the gripper according to claim 1, wherein the method comprises the steps of:
  adjusting the subrange position relative to the main range defined by the synchronization member; and limiting the synchronization member with the limiter to define the subrange and to limit the movement of the plurality of gripper members to said subrange.

26. The method according to claim 25, wherein the limiter comprises a drive member for driving the synchronization member, wherein the drive member has a drive stroke that defines the subrange, wherein the drive member is switchable between a coupled state for driving the synchronization member within the subrange and an uncoupled state in which the drive member is free to move relative to the synchronization member to adjust the subrange position, wherein the method further comprises the steps of:
   switching the drive member to the uncoupled state;
   adjusting the subrange position; and
   switching the drive member to the coupled state.

27. The method according to claim 26, wherein the drive member is steplessly adjusted relative to the synchronization member.

28. The method according to claim 26, wherein the drive member is adjusted relative to the synchronization member in steps.

29. The method according to claim 25, wherein the method further comprises the steps of:
   providing an adjustment member in an adjustment position external to the gripper for setting the subrange position;
   moving the gripper between an operational position in which the gripper is spaced apart from the adjustment member and the adjustment position in which the gripper interacts with the adjustment member;
   setting the subrange position with the adjustment member when the gripper is in the adjustment position.

30. A method according to claim 29, wherein the limiter comprises a drive member for driving the synchronization member, wherein the drive member has a drive stroke that defines the subrange, wherein the adjustment member remains stationary in the adjustment position during the setting of the subrange position, wherein one of the drive member and the synchronization member is moved relative to the adjustment member to adjust the subrange position.

* * * * *